United States Patent [19]

Takahashi

[11] Patent Number: 4,586,537
[45] Date of Patent: May 6, 1986

[54] EMERGENCY DISCONNECTOR FOR FLUID LOADING AND UNLOADING LINES

[75] Inventor: Susumu Takahashi, Niigata, Japan

[73] Assignee: Niigata Engineering Co., Ltd., Tokyo, Japan

[21] Appl. No.: 649,334

[22] Filed: Sep. 11, 1984

Related U.S. Application Data

[62] Division of Ser. No. 444,092, Nov. 24, 1982, Pat. No. 4,512,369.

[30] Foreign Application Priority Data

Feb. 26, 1982 [JP] Japan .............................. 57-25780[U]
Apr. 13, 1982 [JP] Japan .................................. 57-60337

[51] Int. Cl.⁴ ........................................... F16L 29/00
[52] U.S. Cl. ................................ 137/614.04; 137/614
[58] Field of Search ........................... 137/614, 614.04; 251/50, 149

[56] References Cited

U.S. PATENT DOCUMENTS

| | | | |
|---|---|---|---|
| 2,583,295 | 1/1952 | Greer et al. ...................... | 251/50 X |
| 2,689,143 | 9/1954 | Scheiwer ................... | 137/614.04 X |
| 3,139,110 | 6/1964 | Bales ................................ | 137/614.04 |
| 4,074,698 | 2/1978 | Hobson et al. ............. | 137/614.04 X |

FOREIGN PATENT DOCUMENTS 2409445 7/1979 France .................................. 137/614

Primary Examiner—A. Michael Chambers
Assistant Examiner—John C. Fox
Attorney, Agent, or Firm—Sughrue, Mion, Zinn, Macpeak, and Seas

[57] ABSTRACT

An emergency line disconnector for an LNG loading-/unloading line or the like is made capable of accommodating bi-directional fluid flow. Sliders within the fluid passageways are arranged such that a substantially uniform cross-sectional flow path is provided for the fluid. Sealing devices are mounted on the sliders to cut off fluid flow through the device, and such devices are designed so as to be resiliently operable at the extremely low temperatures of LNG. To dissipate the fluid shock due to rapid closure of the device, a fluid shock absorber employing restrictive passageways may be used to slow the advance of the sliders to their cut-off positions.

4 Claims, 17 Drawing Figures

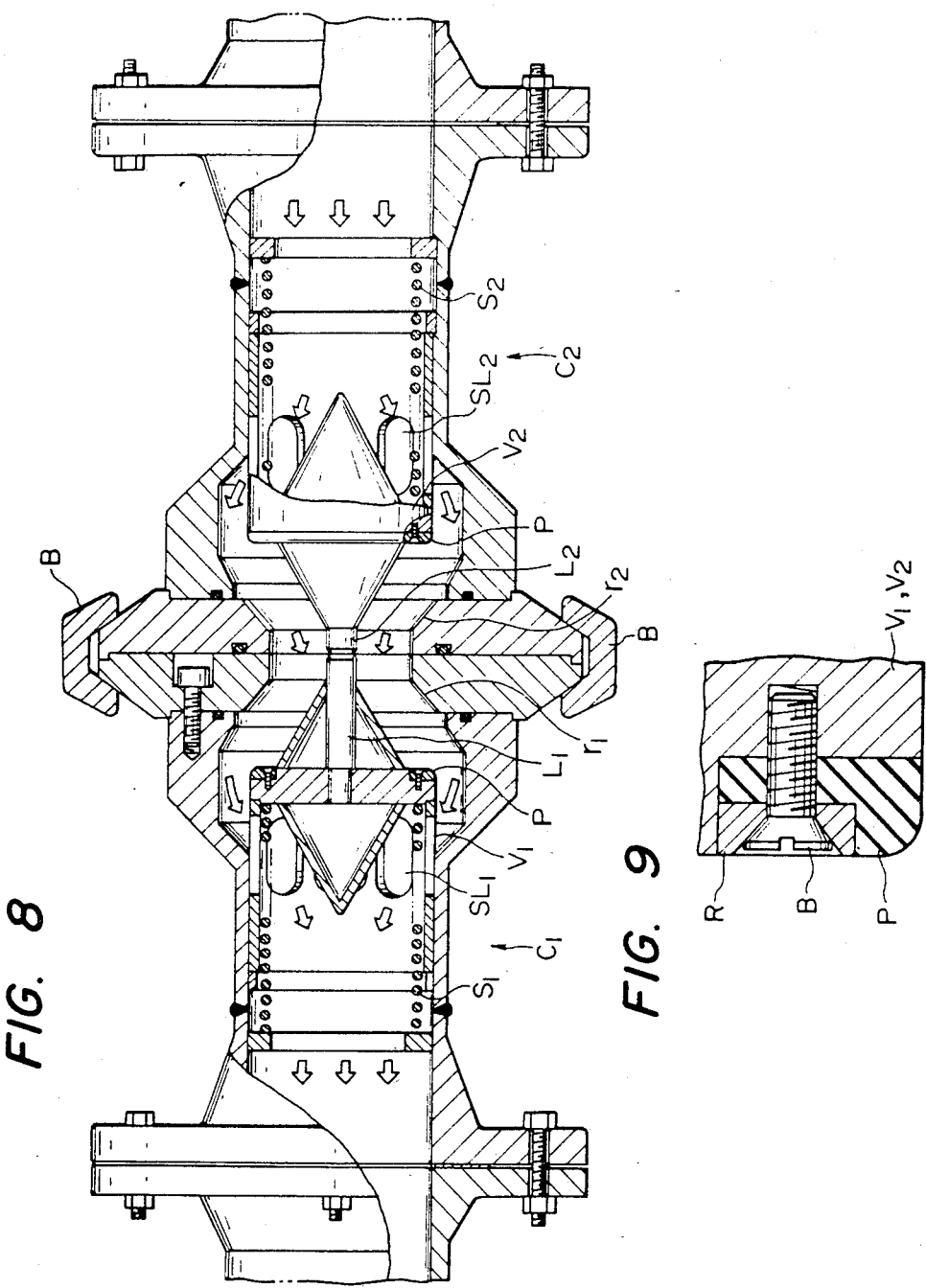

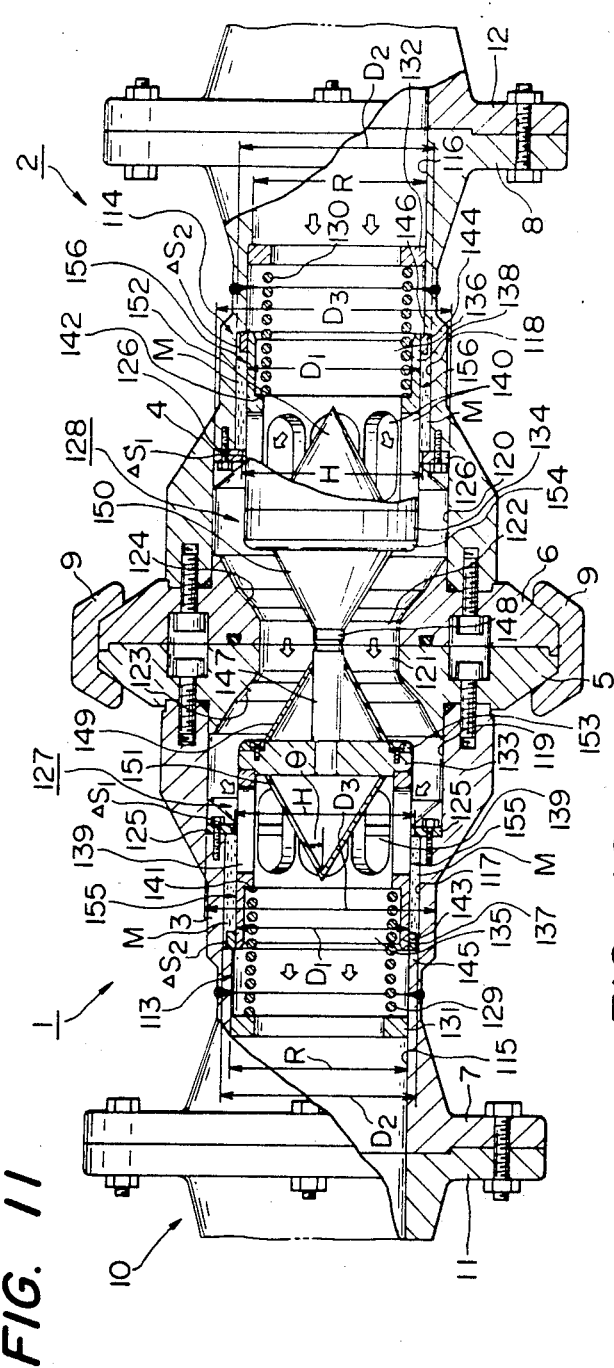
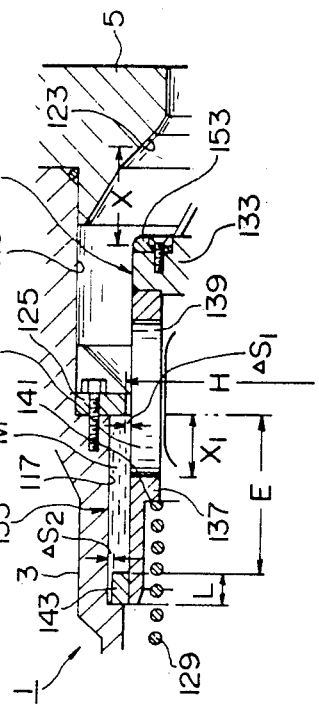
FIG. 11
FIG. 12

EMERGENCY DISCONNECTOR FOR FLUID LOADING AND UNLOADING LINES

This is a division of application Ser. No. 444,092, filed 11/24/82, U.S. Pat. No. 4,512,369.

BACKGROUND OF THE INVENTION

The present invention relates to an emergency disconnector for disconnecting a fluid loading and unloading line in an emergency to cut off the flow of a fluid of an extremely low temperature, such as LNG (liquified natural gas), being conveyed through the line.

Fluid loading and unloading lines are used in such applications as for unloading LNG from an LNG tanker alongside a sea berth to a storage tank or loading LNG from the storage tank to the LNG tanker.

Under rough weather conditions, the LNG tanker tends to become detached from the sea berth due to strong winds or high waves while loading or unloading LNG. In such an emergency, it is necessary that the couplings in the fluid loading and unloading line be disconnected to sever a loader/unloader on the sea berth from the LNG tanker and to cut off the flow of dangerous LNG to prevent unwanted leakage. To meet such a requirement, the fluid disconnector for disconnecting the line in an emergency must quickly stop the fluid flow.

FIGS. 8 through 10 of the accompanying drawings illustrate an emergency line disconnector as proposed in U.S. patent application Ser. No. 444,115, filed concurrently with the present application. This line disconnector comprises a pair of couplings $C_1$, $C_2$ interconnected by connectors B and having therein a pair of slide valves $V_1$, $V_2$, respectively. The slide valves $V_1$, $V_2$ have a pair of projecting spacer rods $L_1$, $L_2$. respectively, held against each other to displace the slide valves in opposite directions against the biasing forces of springs $S_1$, $S_2$ to define a space between the slide valves $V_1$, $V_2$, thereby providing a fluid passageway between the couplings $C_1$, $C_2$ and hence the slide valves $V_1$, $V_2$. A pair of seal packings P, P of nitrile rubber are respectively secured to rings R, R by curing, and are attached to heads of slide valves $V_1$, $V_2$ by screws B, as illustrated in FIG. 9.

During normal operation in conveying a fluid, the fluid flows from the coupling $C_2$ through slots $SL_2$ in the slide valve $V_2$ and slots $SL_1$ in the slide valve $V_1$ into the coupling $C_1$, from which the fluid is discharged, as shown in FIG. 8. In an emergency requiring fluid cutoff, the connectors B, B are removed by external forces to allow the couplings $C_1$, $C_2$ to be disconnected, whereupon the seal packings P, P on the slide valves $V_1$, $V_2$ are moved under the biasing forces of the springs $S_1$, $S_2$ into abutment against sealing portions $r_1$, $r_2$ of the couplings $C_1$, $C_2$, thus cutting off the flow of the fluid as shown in FIG. 10. The seal packings P, P of the emergency line disconnector as described above are required to meet the following requirements:

(1) The material of the seal packing itself should be resilient; and (2) The packing should be secured to the metal rings by heat treatment or the like.

With such an emergency line disconnector, seal packings P, P of rubber, which become brittle at $-30°$ or below cannot withstand sustained use in transporting a fluid such as LNG having a temperature of $-196°$ or lower, that is a cryogenic temperature. A desired degree of sealing cannot be assured between the sealing portions $r_1$, $r_2$ and the slide valves $V_1$, $V_2$, resulting in a tendency for the fluid to leak from the couplings $C_1$, $C_2$ upon emergency line disconnection, a condition which could give rise to an accident.

The seal packings, P, P of rubber could be replaced with seal packings of Teflon mounted on the heads of the slide valves $V_1$, $V_2$, seal packings of Teflon being free from brittleness at extremely low temperature. However, seal packings of Teflon would be likely to come off due to dimensional differences between the metal heads and the seal packings, which would shrink differently at extremely low temperatures. Additionally, seal packings of Teflon are much less resilient than seal packings of rubber, so that the sealing portions $r_1$, $r_2$ could not be completely sealed by the slide valves $V_1$, $V_2$ even with an increased pressure produced by the springs $S_1$, $S_2$.

In addition, since the couplings $C_1$, $C_2$ of the above-desired emergency disconnector are sealed off in a very short period of time, after having been separated, by the resilient force of the springs $S_1$, $S_2$ and fluid pressure, the kinetic energy of the fluid flowing through the line is converted into a pressure upon sudden cutoff of the fluid flow, resulting in problems such as water hammer.

In order to employ this emergency disconnector, it has often been necessary to take suitable additional measures, such as the provision of an additional check valve.

SUMMARY OF THE INVENTION

With the foregoing problems in view, it is an object of the present invention to provide an emergency disconnector capable, in an emergency, of disconnecting a fluid loading and unloading line to reliably cut off the flow of a fluid and particularly a fluid at extremely low temperatures while the fluid is being transported through the line.

The above object can be achieved by providing an emergency disconnector for disconnecting a pair of couplings in a fluid loading and unloading line in an emergency to thereby cut off the fluid through the fluid line, including a pair of couplings, each having a fluid passageway extending through a barrel of a uniform cross section to be joined to one end of the fluid loading and unloading line to an end joint opening, a first inner tapered wall disposed in the fluid passageway and having an inner end closer to the barrel and larger in diameter, and a second inner tapered wall disposed in the fluid passageway and closer than the first inner tapered wall to the barrel and having an inner end larger in diameter and an opposite end of a diameter equal to or greater than the larger diameter of the first inner tapered wall; a pair of slide valves axially slidably inserted in the couplings, respectively, and having a pair of confronting valve heads, each of the slide valves having a retainer disc removably attached to each of the valve heads, and an annular seal packing mounted circumferentially around the valve head and having a portion projecting radially outwardly from the valve head, each of the slide valves being slidable by urging means, when the couplings are disconnected from each other, to press the second seal packing against the second inner tapered wall and also press a circumferential taper end face of the retainer disc against the first inner tapered wall to thereby close the joint openings of the couplings, the slide valves being retainable away from each other against the force of the urging means, when the couplings are joined together, with spacer rods which project axially from centers of the retainer discs being held in abutment against each other, to thereby open the joint openings of the couplings; a pair of stopper rings for limiting the strokes of the sliding movement of the slide valves, respectively, to communicate the fluid passageway in the couplings when the couplings are joined to each other; and a pair of cover rings mounted on inner walls defining the fluid passageway, respectively, between the barrels of the couplings and the second inner tapered walls and having fluid passageways continuous to the fluid passageways in the couplings, the cover rings being engageable with outer peripheral surfaces of the seal packings of the slide valves, each of the seal packings being composed of an elongate seal cover capable of being resilient at extremely low temperatures and a resilient body extending through the seal cover over the entire length thereof.

It is a further object of the present invention to provide an emergency disconnector for fluid loading and unloading lines which is capable of sealing the couplings a predetermined period of time after the couplings have been separated from each other without abruptly cutting off the kinetic energy of fluid being transported through the line, so that problems such as water hammer can be avoided.

The above object can be achieved by providing an emergency disconnector for separating, in an emergency, a pair of couplings in a fluid loading and unloading line to slide slide valves in the couplings under an urging force and fluid pressure to thereby seal off the couplings to cut off the flow of a fluid being loaded or unloaded through the fluid loading and unloading line, the emergency disconnector comprising a pair of guide rings mounted respectively on the slide valves circumferentially therearound in areas which the fluid can enter, and a pair of enclosing rings mounted on inner walls of the outer barrels of the couplings, respectively, the guide rings and the inner walls of the outer barrels, and the enclosing rings and the slide valves defining therebetween gaps serving as fluid restrictors or separate restrictor holes, the guide rings, the enclosing rings, the slide rings, and the inner walls of the outer barrels being capable of defining fluid sealing chambers when the slide valves are moved.

BRIEF DESCRIPTION OF THE DRAWINGS

The present invention will now be described with reference to the drawings, in which:

FIG. 8 is an axial cross-sectional view of a similar emergency disconnector;

FIG. 9 is an enlarged cross-sectional view of a seal packing mounted on a slide valve in the emergency disconnector of FIG. 8;

FIG. 11 is an axial cross-sectional view of a second emergency disconnector for a fluid loading and unloading line according to the present invention;

FIG. 12 is an enlarged cross-sectional view of a fluid sealing chamber thereof;

DETAILED DESCRIPTION OF THE PREFERRED EMBODIMENTS

Figure 1:
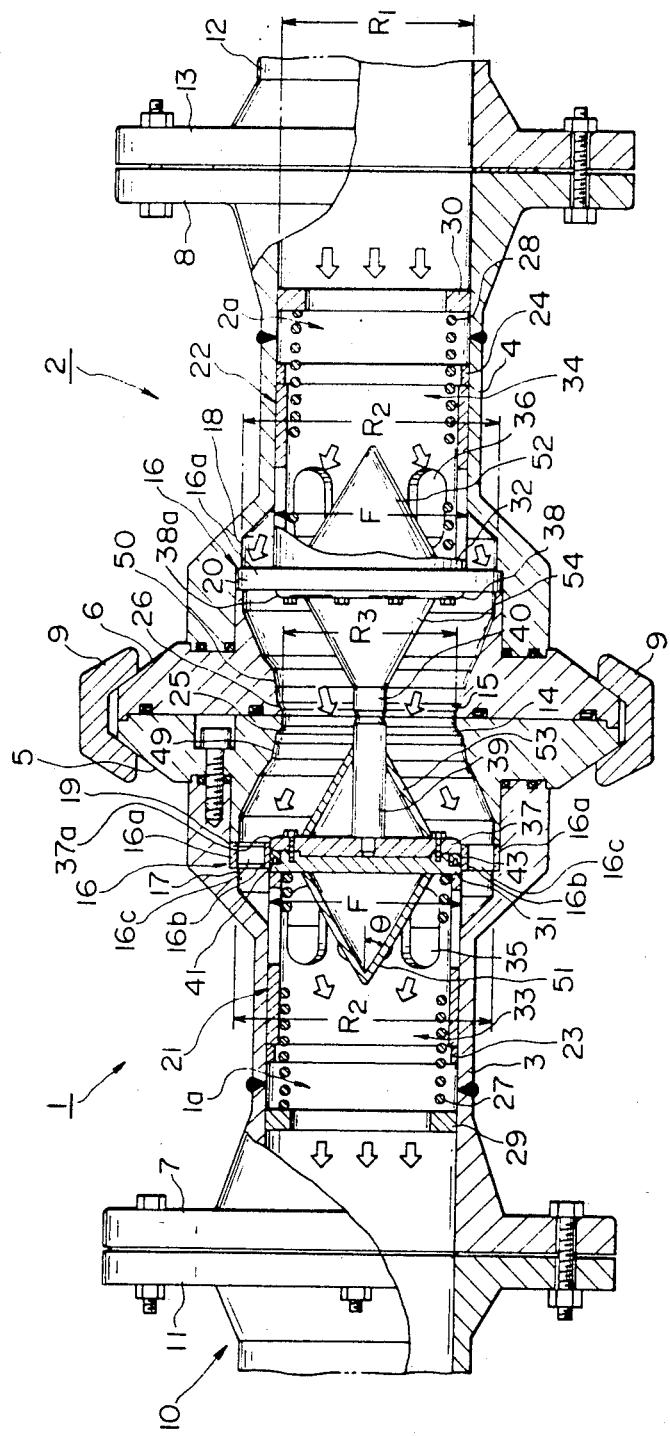
FIG. 1 is an axial cross-sectional view of an emergency disconnector for a fluid loading and unloading line.

FIG. 1 shows, in axial cross section, an emergency line disconnector according to the present invention, which comprises a pair of couplings 1, 2 having an identical cylindrical shape. The couplings 1, 2 have barrels 3, 4, respectively, including at opposite ends thereof a pair of seal rings 5, 6, and a pair of joint flanges 7, 8, respectively. The seal rings 5, 6 are joined together by an annular clamp 9 extending fully around the circumferential edges of the seal rings 5, 6. In an emergency requiring disconnection of the couplings 1, 2, the clamp 9 can be broken into parts under the pressure of a cylinder actuator (not shown) and immediately detached from the seal rings 5, 6.

The joint flange 7 of the couplings 1 is bolted to a joint flange 11 of a connector pipe 10 projecting from the side of a tanker (not shown). The joint flange 8 of the coupling 2 is bolted to a joint flange 13 of a loading arm (not shown) which constitutes part of the fluid loading and unloading line. The loading arm is capable of freely moving and positioning the coupling 2 in three-dimensions into axial alignment with the coupling 1.

The couplings 1, 2 have fluid passageways 1a, 2a with identically shaped inner walls. Portions of the fluid passageways 1a, 2a which extend from the joint flanges 7, 8 to the barrels 3, 4, respectively, have a uniform cross-sectional shape with an inside diameter $R_1$, and portions of the fluid passageways 1a, 2a which extend from the barrels 3, 4 to joint openings 14, 15 in the seal rings 5, 6, respectively, have a cross-sectional shape gradually increasing to an inside diameter $R_2$ ($R_2 < R_1$), and another cross-sectional shape gradually decreasing to an inner diameter of $R_3$ at the joint openings 14, 15 ($R_2 > R_1 > R_3$). The inside diameter $R_2$ serves as inner wall portions 17, 18 to which cover rings 16, 16 are attached, respectively. The couplings 1, 2 are joined together by the clamp 9 and held in mutual communication through the joint openings 14, 15 having the inside diameter $R_3$.

Figure 3:
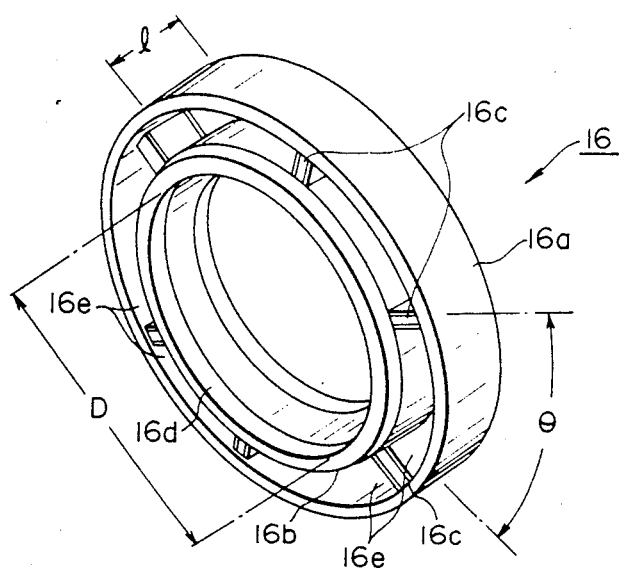
FIG. 3 is a perspective view of a cover ring.

The cover rings 16, 16 will now be described. As shown in FIG. 3, each of the cover rings 16, 16 comprises an outer ring member 16a and an inner ring member 16b with a plurality of radial posts 16c extending therebetween and angularly spaced at equal angular intervals $\theta$, the outer and inner ring members 16a, 16b being concentric with each other. The inner ring member 16b has on an inner peripheral surface thereof an engagement flange 16d extending radially inwardly. The outer and inner ring members 16a, 16b have equal widths or axial lengths l. The engagement flange 16d of the inner ring member 16b has an inside diameter D slightly larger than the outside diameter F of slide valves 21, 22 (described later). The inner wall portions 17, 18 have a pair of attachment grooves 19, 20, respectively, disposed between the barrels 3, 4 and the seal rings 5, 6. The outer ring members 16a, 16a of the cover rings 16, 16 are respectively fitted in attachment grooves 19, 20 to attach the cover rings 16, 16 to the inner wall portions 17, 18, respectively. The engagement flanges 16d, 16d of the inner ring members 16b, 16b of the cover rings 16, 16 are located closer to the barrels 3, 4, respectively, and the outer ring members 16a, 16a have inner peripheral surfaces lying flush with the inner wall portions 17, 18, respectively. The outer periphery of the inner ring member 16b and the posts 16c have chamferred axial front and rear corners to provide a plurality of smooth fluid passageways 16e defined between the outer ring member 16a, the inner ring member 16b, and the posts 16c.

The couplings 1, 2 contain in their fluid passageways 1a, 2a a pair of slide valves 21, 22, respectively, a pair of stopper rings 23, 24 secured to the inner walls of the barrels 3, 4, for limiting the stroke of the slide valves 21, 22, a pair of coil compression springs 27, 28 urging the slide valves 21, 22, respectively toward first inner tapered walls 25, 26 of the seal rings 5, 6, and a pair of annular spring stops 29, 30 affixed to the inner walls of the barrels 3, 4, respectively, and against which ends of the coil springs 27, 28 are held, respectively. The slide valves 21, 22 are of an identical cylindrical configuration, and have ends closed off by a pair of valve heads 31, 32 with the other ends open as inlet openings 33, 34 for the admission of fluid. The cylindrical surfaces of the slide valves 21, 22 have axially oblong slots 35, 36, respectively, defined at equal intervals in the circumferential direction. The slide valves 21, 22 have an outside diameter F selected such that the slide valves 21, 22 may be inserted respectively in the barrels 3, 4 having the inside diameter $R_1$ with a predetermined dimensional tolerance.

The first inner tapered walls 25, 26 have axial inner ends of larger diameter. To the valve heads 31, 32, there are bolted a pair of retainer discs 37, 38 having a diameter equal to the outside diameter F of the slide valves 21, 22 and supporting a pair of confronting spacer rods 39, 40, respectively, projecting from the centers of the retainer discs 37, 38. The retainer discs 37, 38 have a pair of tapered end faces 37a, 38a, respectively, extending fully circumferentially and shaped in complementary relation to the first inner tapered walls 25, 26 of the seal rings 5, 6.

Figure 4:
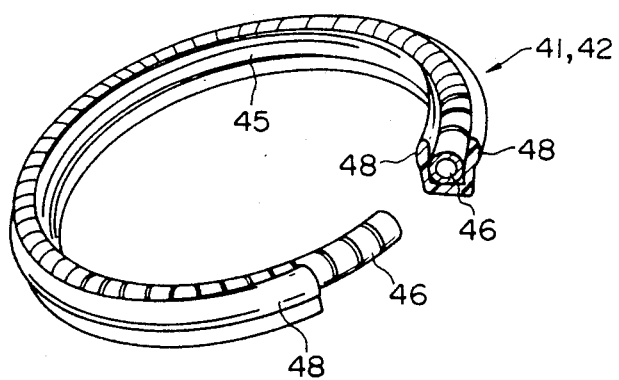
FIG. 4 is a perspective view of a seal packing.
Figure 6:
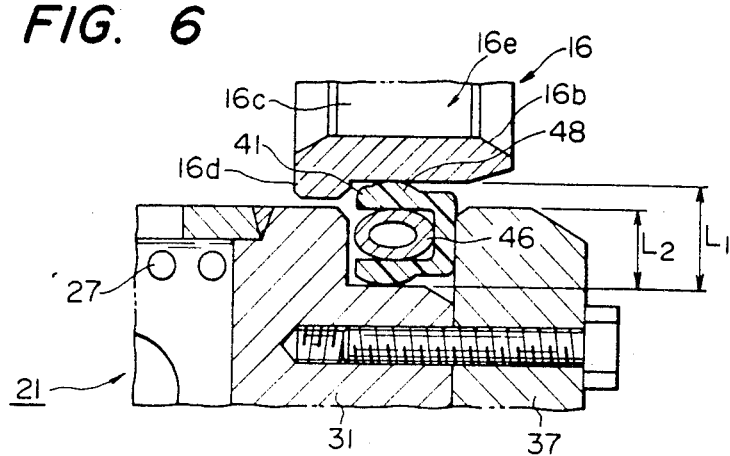
FIG. 6 is an enlarged cross-sectional view of the seal packing shown in FIG. 5(A) and surrounding parts.

The valve heads 31, 32 have in corners thereof a pair of steps, respectively, extending fully along their circumferences. The valve heads 31, 32 and the retainer discs 37, 38 jointly define therebetween along the steps a pair of retainer slots 43, 44, respectively, in which are placed a pair of annular seal packings 41, 42 which can withstand extremely low temperatures. As illustrated in FIGS. 4, 6 and 7, the seal packings 41, 42 are made of a material such as Teflon capable of withstanding extremely low temperatures (for example, $-196°$ C. of LNG) and retaining its elasticity at such extremely low temperatures without being deteriorated and damaged. Each of the seal packings 41, 42 is composed of an elongate seal cover 45 having a substantially U-shaped cross section and a spiral spring 46 fitted as a resilient body in the seal cover 45 and extending longitudinally thereof. The seal cover 45 includes opposite edges having on their outer surfaces a pair of pressers 48, 48 projecting away from each other and extending longitudinally of the seal cover 45. The seal cover 45 has a maximum width $L_1$ across the pressers 48, 48, the width $L_1$ being greater than the depth $L_2$ of the retainer slots 43, 44. The said packings 41, 42 are received and axially positioned respectively in the retainer slots 43, 44 in the slide valves 21, 22 fully along the circumference of the seal rings 41, 42. The pressers 48 of the seal packings 41, 42 project out of the retainer slots 43, 44 with open sides of the seal covers 45, 45 being directed toward the barrels 3, 4, respectively, of the couplings 1, 2.

While couplings 1, 2 are joined together for normal use, the slide valves 21, 22 are caused by the spacer rods 39, 40 to be kept away from each other against the force of the compression springs 27, 28. When the slide valves 21, 22 are positionally held by the stopper rings 23, 24, respectively, the pressers 48 of the seal packings 41, 42 are pressed against the inner peripheral surfaces of the inner ring portions 16b and the engagement flanges 16d of the cover rings 16. When the couplings 1, 2 are disengaged from each other in case of emergency, the slide valves 21, 22 slide under the biasing forces of the coil springs 27, 28 to move the pressers 48 of the seal packings 41, 42 into abutment against second inner tapered walls 49, 50, respectively, located axially inwardly of the first inner tapered walls 25, 26 of the couplings 1, 2, respectively. The second inner tapered walls 49, 50 have inner ends closer to the barrels 3, 4 and larger in diameter and opposite ends of a smaller diameter equal to or greater than the larger diameter of the first inner tapered walls 25, 26.

Cones 51, 52, 53, 54 are disposed on the spacer rods 39, 40 and in the slide valves 21, 22, respectively. The cones 51, 52 are mounted on inner surfaces of the valve heads 31, 32 with pointed ends directed toward the joint flanges 7, 8, respectively. The cones 53, 54 extend respectively between the retainer disc 37 and the spacer rod 39 and between the retainer disc 38 and the spacer rod 40.

The stopper rings 23, 24 are positioned such that when the couplings 1, 2 are interconnected with the spacer rods 39, 40 pressed against each other to slide the slide valves 21, 22 respectively against the stopper rings 23, 24, the joint openings 14, 15 communicate through the slots 35, 36 with the fluid passageways 1a, 2a, respectively. The cones 51, 52, 53, 54 have tapered walls inclined at an angle $\theta$ with respect to the axis of the cones, the angle $\theta$ being selected such that when the couplings 1, 2 are interconnected, the walls of the cones 51, 52, 53, 54 are spaced from the inner walls of the fluid passageways 1a, 2a to provide a substantially uniform cross section for the fluid passageways 1a, 2a throughout their length.

Figure 5A:
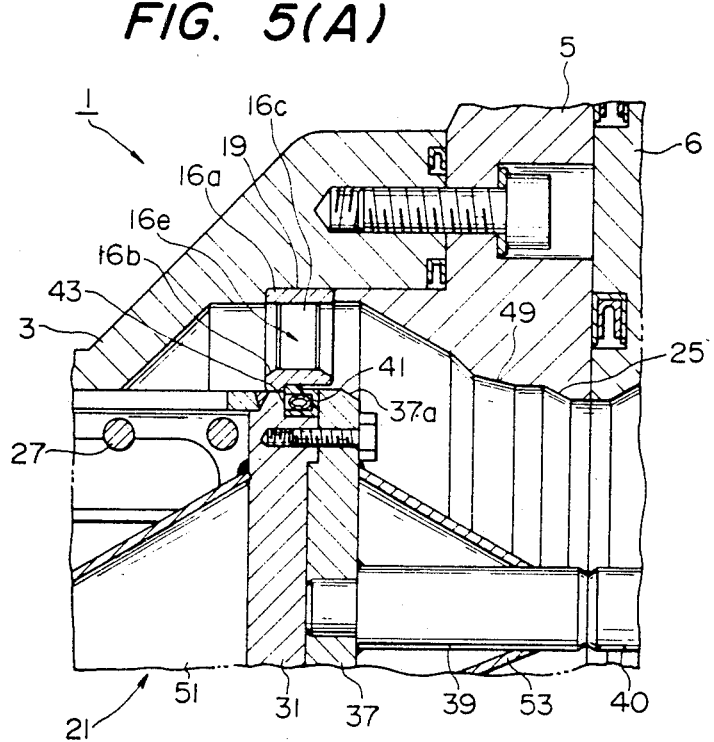
FIG. 5(A) is a fragmentary cross-sectional view of a portion around the seal packing as positioned when the couplings are joined together.

The operation of the emergency line disconnector of the foregoing construction is as follows:

Under normal conditions of use, in which the couplings 1, 2 are interconnected with the seal rings 5, 6 joined to each other by the annular clamp 9, the spacer rods 39, 40 are pressed against each other to push the slide valves 21, 22 slidingly toward the joint flanges 7, 8 against the resiliency of the coil springs 27, 28, respectively, until the slide valves 21, 22 are limited to their sliding motion by the stopper rings 23, 24. The slide valves 21, 22 are thus fixedly retained between the stopper rings 23, 24. As shown in FIGS. 5(A) and 6, the seal packing 41 on the slide valve 21 is held against the inner peripheral surface of the inner ring member 16b and the engagement flange 16d of the cover ring 16, and the presser 48 of the seal packing 41 is pressed against the inner ring member 16b under the force of the spring 46 of the seal packing 41 which is pressed radially inwardly. Likewise, the presser 48 of the seal packing 42 on the slide valve 22 is pressed against the inner ring member 16b. Therefore, the seal packings 41, 42 are held in intimate contact with the cover rings 16, 16 and the slide valves 21, 22, respectively.

When a dangerous fluid such as LNG is to be loaded from the storage tank into the tanker, fluid flows from the transport pipe 12 through the fluid passageway 2a in the coupling 2 into the inlet opening 34 of the slide valve 22 in the direction of the arrows. The fluid stream as it flows out of the slide valve 22 is subjected to reduced resistance due to the cone 52 and is divided thereby into spreading directions out of the slots 36, and flows through the fluid passageways 16e in the cover ring 16. The fluid then goes through spaces between the first and second inner tapered walls 26, 50 of the seal ring 6 and the cone 54, and the between the first and second nner walls 25, 49 of the seal ring 5 and the cone 53, and flows through the fluid passageways 16e in the cover ring 16 in the coupling 1 and the slots 35 in the slide valve 21 into the inlet opening 33 thereof, from which the fluid is loaded into the tanker through the connector pipe 10.

For unloading the fluid from the tanker into the storage tank, the fluid flows in an opposite direction from the connector pipe 10 through the passageway 1a in the coupling 1 into the inlet opening 33 of the slide valve 21 in a direction opposite to that of the arrows. The fluid stream, as it flows out of the slide valve 21, is subjected to reduced resistance due to the cone 51 and is divided thereby into spreading directions out of the slots 35, and flows through the fluid passageway 16e in the cover ring 16. The fluid then goes through a space between the second and first inner tapered walls 49, 25 of the seal ring 5 and the cone 53, and flows through the fluid passageways 16e in the cover ring 16 in the coupling 2, and through the slots 36 in the slide valve 22 into the inlet opening 34 thereof, from which the fluid is unloaded into the storage tank through the loading arm.

Figure 2:
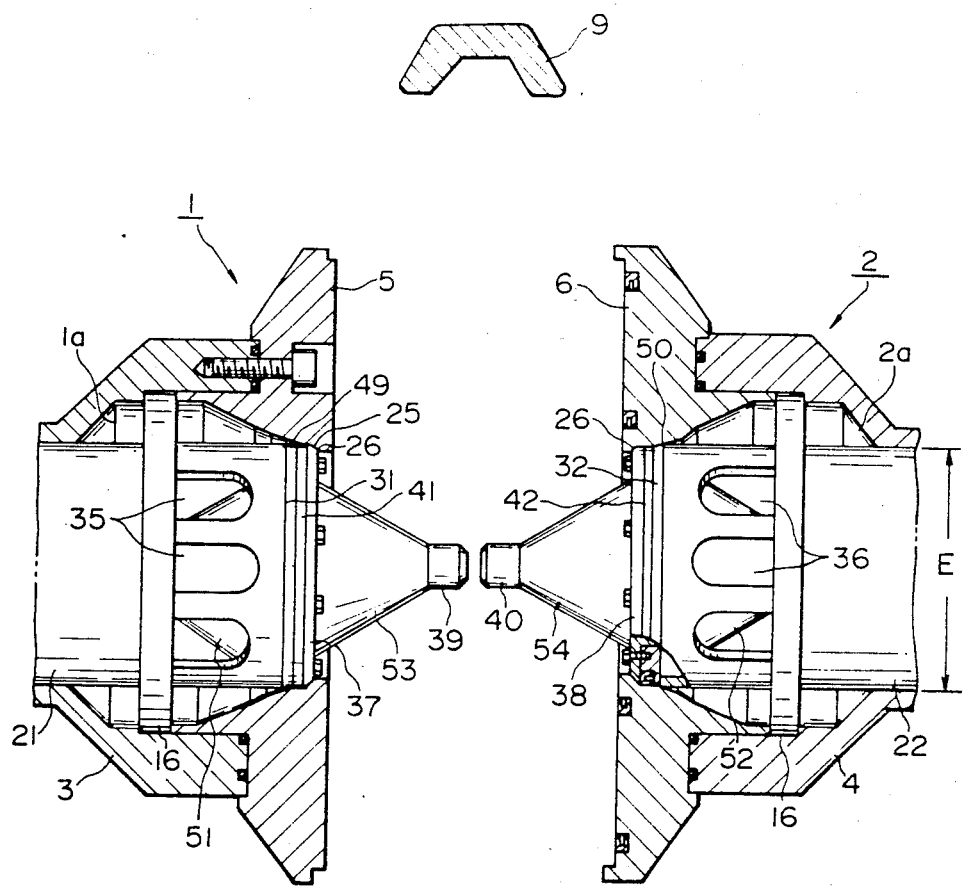
FIG. 2 is an axial cross-sectional view of the emergency disconnector as it is separated.
Figure 7A:
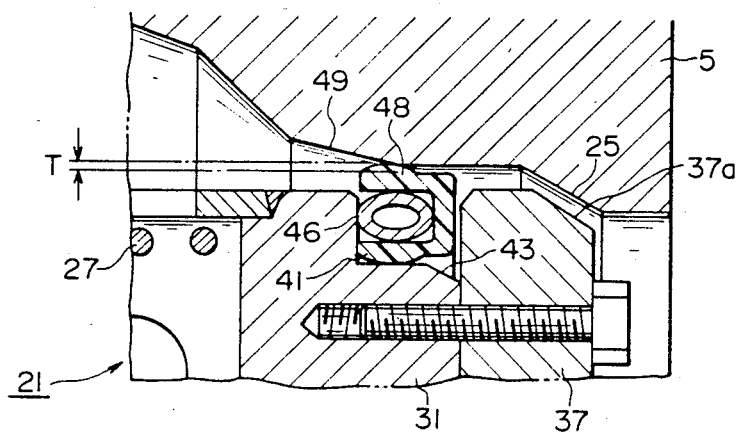
FIG. 7(A) is an enlarged cross-sectional view of the seal packing held against a second inner tapered wall.

In any case, there is no danger of the seal packings 41, 42 buckling or being damaged under the axial force produced by the fluid as it passes, since the pressers 48 of the seal packings 41, 42 are protected by the cover rings 16, 16. The substantially uniform cross-sectional area of the fluid passageway between the slide valves 21, 22 minimizes any pressure loss resulting from friction even if the fluid to be loaded or unloaded has a high viscosity, and does not reduce the speed at which the fluid flows. With the slide valves 21, 22 fixedly retained between the stopper rings 23, 24, the fluid can stably flow in opposite directions through the emergency line disconnector. In an emergency in which the tanker moves off of the sea berth while loading or unloading fluid, for example, and the fluid loading and unloading line should be disconnected quickly, the clamp is immediately removed from the seal rings 5, 6, by a power cylinder (not shown), whereupon the couplings 1, 2 are disconnected, as shown in FIG. 2. Upon disconnection of the couplings 1, 2 the slide valves 21, 22 slide under the force of the coil springs 27, 28 toward the joint openings 14, 15. As shown in FIG. 7(A), the presser 48 of the seal packing 41 is brought into engagement with the second inner tapered wall 49 of the seal ring 5, and similarly, the presser 48 of the seal packing 42 is pressed against the second inner tapered wall 50 of the seal ring 6. At this time, the tapered end face 37a of the retainer disc 37 is not abutted against the first inner wall 25 of the seal ring 5, and the end face 38a of the retainer disc 38 is not abutted against the first inner wall 26 of the seal ring 6. The slide valves 21, 22 are pushed under the force of the coil springs 27, 28 to force the pressers 48, 48 of the seal packings 41, 42 onto the second inner walls 49, 50 of the seal rings 5, 6, respectively, against the force of the springs 46, 46, while the pressers 48, 48 are radially inwardly pressed by a radial dimensional difference T between the minimum diameter of the second inner tapered walls 49, 50 of the seal rings 5, 6 and the inside diameter of the wall portions on which the pressers 48, 48 of the seal packings 41, 42 has been placed.

Figure 5B:
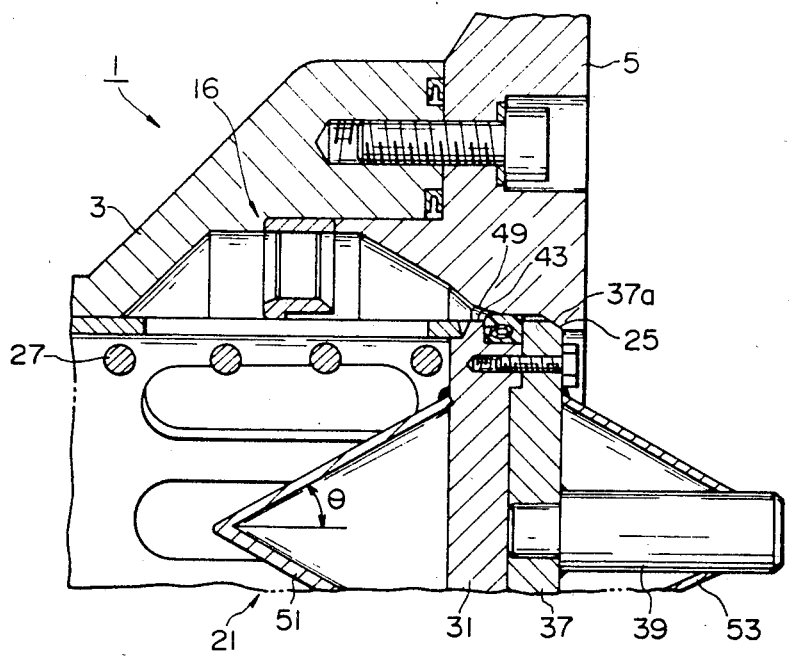
FIG. 5(B) is a fragmentary cross-sectional view of a portion around the seal packing as positioned when the couplings are disconnected.
Figure 7B:
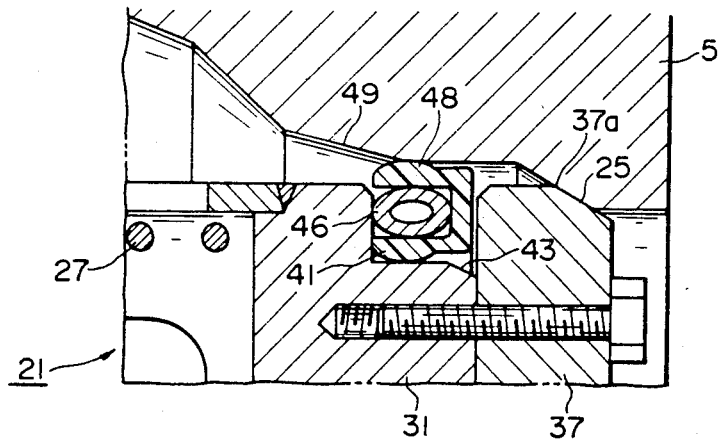
FIG. 7(B) is an enlarged cross-sectional view of the seal packing shown in FIG. 5(B)
Figure 10:
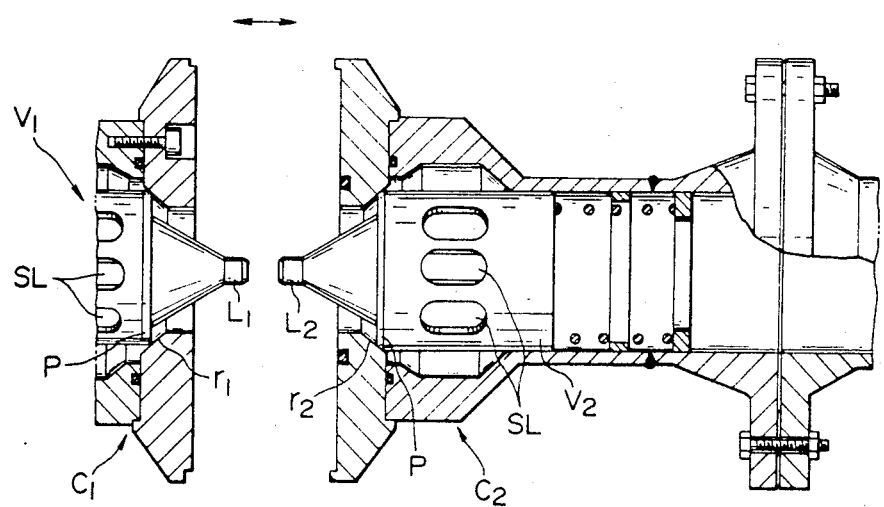
FIG. 10 is an axial cross-sectional view of the emergency disconnector of FIG. 8 as it is separated.

As the seal packings 41, 42 are forced onto the second inner taper walls 49,50 with a sufficient distance, the tapered end face 37a of the retainer disc 37 is brought into engagement with and positioned by the first inner tapered wall 25 of the seal ring 5, and likewise, the tapered end face 38a of the retainer disc 48 engages and is positioned by the first inner wall 26 of the seal ring 6, as shown in FIGS. 5(B) and 7(B).

Upon engagement of the end faces 37a, 38a with the first inner walls 25, 26, respectively, the seal packings 41, 42 are positioned in the axial direction of the couplings 1, 2, and the joint openings 14, 15 in the seal rings 5, 6 are fully closed off by the seal packings 41, 42 simultaneously with the disconnection of the couplings 1, 2. Therefore, the flow of the fluid which has been conveyed through the couplings 1, 2 is immediately and reliably cut off without any risk of fluid leakage from the couplings 1, 2.

In an emergency, as described above, the end faces 37a, 38a of the retainer discs 37, 38 are pressed against the first inner tapered walls 25, 26, respectively so that the seal packings 41, 42 are positioned in a predetermined place axially of the couplings 1, 2. Even when the seal packings 41, 42 and the seal rings 5, 6 are subjected to different rates of dimensional shrinkage under the influence of a fluid having an extremely low temperature, any dimensional difference produced can be taken up by the radial dimensional difference T of the second inner walls 49, 50 by which the seal packings 41, 42 are radially pressable. There is therefore no danger of the seal rings 5, 6 undergoing unwanted stress when the slide valves 21, 22 hit the seal rings 5, 6. The seal packings 41, 42 can retain their elasticity when in contact with the fluid at an extremely low temperature, and hence are free from damage which would otherwise cause fluid leakage from the couplings 1, 2 in case of an emergency.

The emergency disconnector for disconnecting a pair of couplings in a fluid loading and loading line in an emergency to thereby cut off a fluid flow through the fluid loading and unloading line, includes, according to this embodiment of the invention, a pair of couplings each having a fluid passageway extending through a barrel of uniform cross section to be joined to one end of the fluid loading and unloading line to an end joint opening, a first inner tapered wall disposed in the fluid passageway and having an inner end closer to the barrel and larger in diameter, and a second inner tapered wall disposed in the fluid passageway and closer than the first inner tapered wall to the barrel and having an inner end larger in diameter and an opposite end of a diameter equal to or greater than the larger diameter of the first inner tapered wall; a pair of slide valves axially slidably inserted in the couplings, respectively, and having a pair of confronting valve heads, each of the slide valves having a retainer disc removably attached to each of the valve heads, and annular seal packing mounted circumferentially around the valve head and having a portion projecting radially outwardly from the valve head, each of the slide valves being slidable by urging means, when the couplings are disconnected from each other, to press the second seal packing against the second wall and also press a circumferential tapered end face of the retainer disc against the first wall to thereby close the joint openings of the couplings, the slide valves being retainable away from each other against the force of the urging means, when the couplings are joined together, with spacer rods which project axially from centers of the retainer discs held in abutment against each other, to thereby open the joint openings of the couplings; a pair of stopper rings for limiting the strokes of sliding movement of the slide valves, respectively; and a pair of cover rings mounted on inner walls defining the fluid passageways, respectively, between the barrels of the couplings and the second walls and having fluid passages contiguous to the fluid passages in the couplings, the cover rings being engageable with outer peripheral surfaces of the seal packings of the slide valves, each of the seal packings being composed of an elongate seal cover capable of being resilient at extremely low temperatures and a resilient body extending through the seal cover over the entire length thereof. When the couplings are joined together, the seal packings are protected by the cover rings for protection against the fluid. With the couplings disconnected from each other, the seal packings with the resilient bodies therein are not pressed axially of the couplings for sealing, but are pressed radially by a radial dimensional difference with the second walls. In case of emergency, the emergency disconnector of the invention can cut off the flow of a fluid of extremely low temperature as well as an ordinary fluid being transported with an increased degree of reliability.

FIG. 11 shows, in axial cross section, a second embodiment of an emergency line disconnector according to the present invention, which also comprises a pair of couplings 1, 2 having an identical cylindrical shape.

The couplings 1, 2 have fluid passages 113, 114 of identical configurations. The fluid passageways 113, 114 include first inner walls 115, 116 extending from the joint flanges 7, 8 to intermediate portions of the outer barrels 3, 4 and having an inside diameter R, and second inner walls 117, 118 having an inside diameter $D_2$ ($D_2 > R$) and third inner walls 119, 120 having an inside diameter $D_3$ ($D_3 > D_2$), the second and third inner walls extending from the intermediate portions of the outer barrels 3, 4 toward the seal rings 5, 6. The portions of the fluid passageways which extend from the third inner walls 119, 120 to joint openings 121, 122 in the seal rings 5, 6 have a cross-sectional area decreasing relatively gradually, and include tapered seal surfaces 123, 124, respectively, with which the slide valves 127, 128 are engageable. The third inner walls 119, 120 and the second inner walls 117, 118 have steps therebetween to which enclosing rings 125, 126 are attached, respectively.

The couplings 1, 2 are joined together by the clamp 9 with the fluid passageways being held in communication with each other through the joint openings.

The couplings 1, 2 contain respectively in the fluid passageways 113, 114 thereof, a pair of slide valves 127, 128, a pair of springs 129, 130 for urging the slide valves 127, 128 against the seal surfaces 123, 124 of the seal rings 5, 6, respectively, and a pair of stopper rings 131, 132 secured to the first inner walls 115, 116, respectively, and against which ends of the springs 129, 130 are held.

The slide valves 127, 128, which are of an identical cylindrical shape, have one ends closed off by valve heads 133 134 and the other ends formed as openings 135, 136 through which a fluid can flow in. The slide valves have slide rings 137, 138, respectively, having an outside diameter $D_1$ smaller than the inside diameter $D_2$ of the second inner walls 117, 118 and also smaller than the inside diameter H of the enclosing rings 125, 126, with a predetermined gap $\Delta S_1$ defined therebetween, as shown in FIG. 12. The slide rings 137, 138 have axial slots 139, 140 defined at intervals around the circumference thereof. The slide rings 137, 138 also have, an inner peripheral surfaces thereof, steps 141, 142, respectively, held in engagement with the other ends of the springs. A pair of guide rings 143, 144 are fixedly mounted on an outer surface of the slide rings 137, 138 at their openings 135, 136 or rear ends thereof, and have an outside diameter smaller than the inside diameter $D_2$ of the second inner walls 117, 118 with predetermined gaps $\Delta S_2$ being defined as restrictor gaps between the guide rings and the second inner walls. The restrictor gaps $\Delta S_2$ have an axial length L.

A pair of central spacer rods 147, 148 project in confronting relation from the valve heads of the slide valves. Cones 149, 150, 151, 152 are mounted on the spacer rods and in the slide rings 137, 138, respectively. The valve heads 133, 134 have a pair of seal packings 153, 154, respectively, attached to ends thereof and extending fully along the circumference thereof.

The first inner walls 115, 116 and the second inner walls 117, 118 have steps 145, 146 defined therebetween and serving as stoppers against which the guide rings 143, 144 of the slide valves can be held, for limiting the stroke or sliding movement of the slide valves. The second inner walls 117, 118, the slide rings 137, 138 of the slide valves 127, 128, the guide rings 143, 144, and the enclosing rings 125, 126, jointly define fluid chambers 155, 156. As illustrated in FIGS. 11 and 12, when the couplings 1, 2 are joined together for normal use with the slide valves urged against the bias of the spring and the guide rings 143, 144 engaging the steps 145, 146, the fluid chambers 155, 156 communicate with the slots 139 through an opening width $x_1$, as shown in FIG. 12. The guide rings 143, 144 are spaced from the enclosing rings 125, 126 by a distance E, which is greater than the distance x between the seal rings 153, 154 and the seal surfaces 123, 124.

The cones 149, 150, 151, 152 have conical surfaces extending at an angle $\theta$ with respect to the axis of the couplings 1, 2, the angle being selected such that the fluids can flow through a substantially uniform cross-sectional area in the assembled couplings 1, 2.

The operation of the emergency disconnector thus constructed will now be described.

When the couplings 1, 2 are joined to each other by the clamp 9 for normally loading and unloading a fluid therethrough, the slide valves are caused by the spacer rods to be pushed against the force of the springs into engagement with and retained in the predetermined position by the steps 145, 146. The slots 139, 140 in the slide valves are partly open into the fluid chambers 155, 156.

When loading the fluid from the storage tank to the tanker, the fluid flows from the loading arm through the first inner wall 116 of the coupling 2 into the opening 136 in the slide valve 128 in the direction of the arrows, from which the fluid goes through the slots 140, a space between the third inner wall 120 and the slide valve 128, a space between the cone 150 and the seal ring 6, and the joint openings 121, 122 into the fluid passageway 113 of the coupling 1. The fluid introduced into the fluid passageway 113 passes through a space between the cone 149 and the seal ring 5, a space between the third inner wall 119 and the slide valve 127, the slots 139, the opening 135, and the first inner wall 115 into the connector pipe 10, from which the fluid is loaded into the tanker.

Conversely, when fluid is to be unloaded from the tanker to the storage tank, the fluid flows in a direction opposite to that described above. More specifically, the fluid flows in a direction opposite to that of the arrows from the connector pipe 10 through the slots 139, the joint openings 121, 122, the slots 140, and the loading arm into the storage tank.

Therefore, fluid can be stably loaded and unloaded bidirectionally through the joined couplings 1, 2. Since the slots 139, 140 are always open into the fluid chambers 155, 156 when the fluid is loaded or unloaded, the fluid chambers are filled with fluid at all times.

Figure 13:
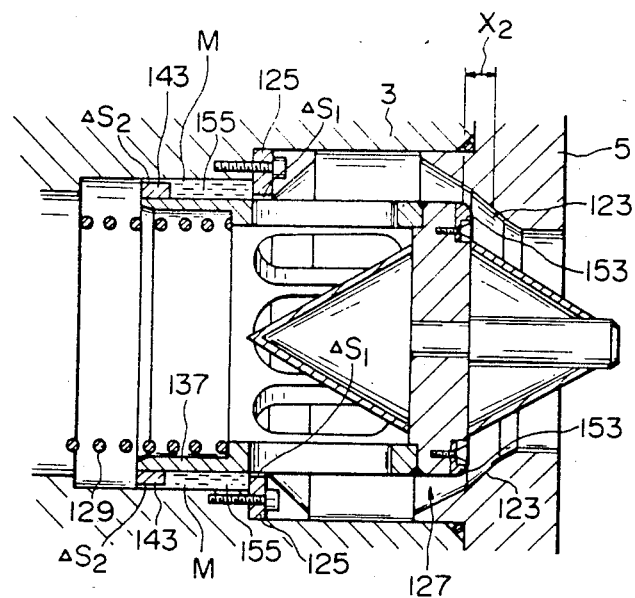
FIG. 13 is a fragmentary cross-sectional view illustrative of the manner in which fluid starts to be sealed in the fluid sealing chamber after the couplings have been disconnected.
Figure 14:
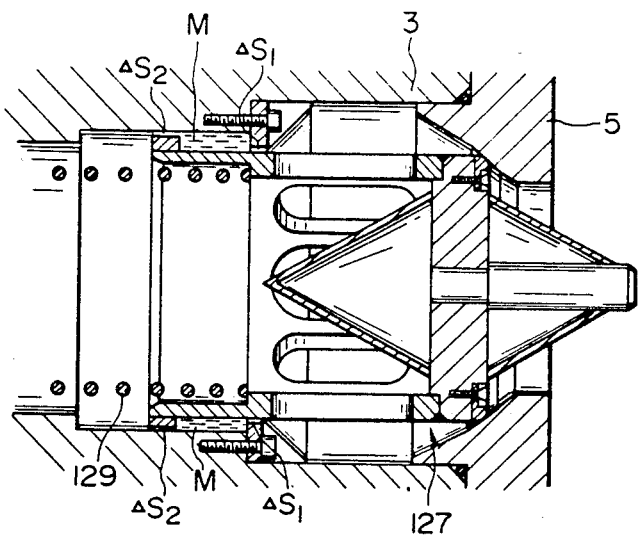
FIG. 14 is a fragmentary cross-sectional view showing the manner in which the fluid leaks out of the fluid sealing chamber to allow a slide valve to be held against a seal surface.
Figure 15:
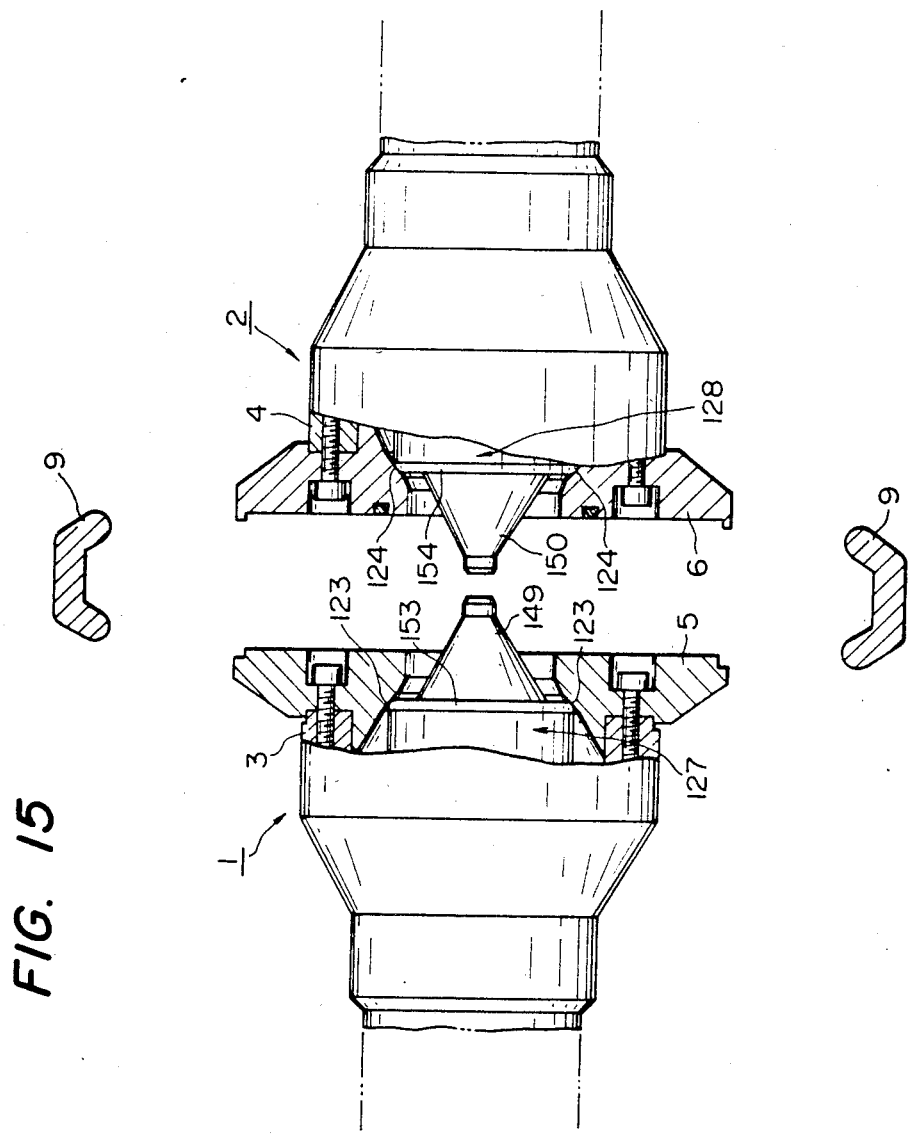
FIG. 15 is a side elevational view, with parts cut away, of couplings as they are separated.

In an emergency where it is necessary to cut off the fluid loading and unloading line immediately, the clamp 9 is detached as shown in FIGS. 13 through 15 to separate the couplings 1, 2.

Simultaneously with the disconnection of the couplings 1, 2, the slide valves are pushed under combination of the reactive force of the springs 129, 130 and the fluid pressure to cause the slide rings 137, 138 of the slide valves 127, 128 to slide to the right (FIG. 13) by the opening width $x_1$, whereupon the fluid chambers 155, 156 are confined between the guide rings 143, 144, the enclosing rings 125, 126, the outer barrels 3, 4, and the slide rings 137, 138 to seal a mass M of fluid in each of the fluid chambers. At this time, the seal packings 153, 154 are spaced from the seal surfaces 123, 24 by a distance $x_2$.

As the slide valves and the slide rings slide further, the distance between the guide rings 143, 144 and the enclosing rings 125, 126 becomes smaller to pressurize the mass M of fluid in the fluid chambers 155, 156. The mass M of fluid thus under pressure produces a cushioning effect on the guide rings 143, 144 and the enclosing rings 125, 126. Then, the mass M of fluid begins leaking out of the fluid chambers through the gaps $\Delta S_1$, $\Delta S_2$, which however serve as restrictors for limiting the amount of the fluid leaking out therethrough. Therefore, it requires a certain period of time for the slide valves to slide along until the seal packings 153, 154 are brought into contact with the seal surfaces 123, 124, respectively, after having slid the distance $x_2$. There is thus no danger of the slide valves sliding freely and abruptly under the force of the springs 129, 130 and the fluid pressure, and hence of the couplings 1, 2 to be cut off suddenly. The slide valves are accordingly allowed to slide at a reduced speed to thereby eliminate the problem of water hammer, for example, occurring in the couplings 1, 2. After a certain period of time required for the slide valves 127, 128 to slide to the end of their strokes, the seal packings 153, 154 of the slide valves are held against the seal surfaces 123, 124, thereby completely sealing off the couplings.

The time t required for the slide valves to slide thusly can be determined by the following equations:

(1) The pressure under which the fluid is sealed:

$$P = F/[(\pi/4)(D_1^2 - D_1^2)] \tag{1}$$

where:

F: the combination of the reactive force of the spring and the fluid pressure;
$D_1$: the outside diameter of the slide ring; and
$D_2$: the inside diameter of the second inner wall.

(2) The amount of fluid which has leaked through the gaps $\Delta S_1$, $\Delta S_2$: Q $$Q = (\pi \cdot R \cdot \Delta S_3 \cdot P)/6 \cdot \mu \cdot L \tag{2}$$

where:

R: the gap diameter $D_1/2$ or $D_2/2$;
$\mu$: the fluid viscosity; and
L: the length of the restrictor gap.

(3) The volume of fluid discharged from the fluid chamber: V $$V = (\pi/4)(D_1^2 - D_1^2) \cdot x_2 \tag{3}$$

where $x_2$: the gap between the seal packing and the seal surface at the time when the fluid begins to be sealed.

Assuming that the equations (1) through (3) are equivalent to the restriction effects given by the gaps $\Delta S_1$, $\Delta S_2$, the valve sliding time t for the gap $X_2$ can be represented by:

$$t = V/(2 \cdot Q)$$

According to actual calculations, where $\Delta S = 0.05$ mm, $L = 12$ mm in a shape for use with 3 in. diameter, the time t is 1.16 sec. when the fluid is water.

Instead of defining the gaps $\Delta S_1$, $\Delta S_2$ as the restrictors between the guide rings 143, 144, the outer barrels 3, 4, the enclosing rings 125, 126, and the slide rings 137, 138, the guide rings, slide valves, or the enclosing rings themselves may have restrictor holes, for example, for limiting the speed of sliding movement of the slide valves.

With the arrangement of this embodiment of the present invention, as described above, the guide rings and the enclosing rings are mounted circumferentially around the slide valves in areas in which the fluid can enter, and the fluid restrictor gaps or holes are defined between the guide rings and the inner walls of the couplings and between the enclosing rings and the slide valves. When the slide valves slide, the guide rings, the enclosing rings, the slide valves, and the inner walls of the outer barrels of the couplings jointly define fluid sealing chambers. After the couplings have been disconnected from each other, the mass of fluid sealed in the fluid chambers between the guide rings and the enclosing rings is capable of producing a cushioning effect.

The restrictor gaps or holes serve to limit leakage of the fluid therethrough. Accordingly, a certain period of time is required before the seal packings on the slide valves are brought into contact with the seal surfaces. There is thus no risk of the slide valves suddenly cutting off the kinetic energy of the fluid being loaded or unloaded. The couplings are completely sealed off and the cause of the water hammer problem is eliminated.

What is claimed is:

1. An emergency disconnector for a fluid loading and unloading line, comprising; a pair of couplings having joint openings, slide valves respectively disposed in said couplings, means urging said slide valves in a direction to seal off the couplings to thereby cut off the flow of a fluid being loaded and unloaded through the fluid loading and unloading line, a pair of guide rings respectively mounted on said slide valves circumferentially therearound, and a pair of enclosing rings mounted on inner walls of outer barrels of said couplings, respectively, said guide rings and said inner walls of said outer barrels, and said enclosing rings and said slide valves respectively defining therebetween gaps serving as fluid restrictor means, said guide rings, said enclosing rings, said slide valves, and said inner walls of said outer barrels being capable of defining fluid chambers upon sliding of said slide valves.

2. An emergency disconnector as claimed in claim 1, wherein an inner wall of said outer barrels, said guide rings, said enclosing rings and an outer surface of said slide valves together defining fluid reservoirs.

3. An emergency disconnector as claimed in claim 2, said fluid reservoirs being substantially closed off when said slide valves move to cut off said fluid passages, and constituting a damping means retarding movement of said slide valves, said fluid reservoirs including restrictive outlets controlling damping of said slide valves.

4. An emergency disconnector for a fluid loading and unloading line, comprising; a pair of couplings each having a fluid passage, a pair of slide valves axially slidably movable within said couplings and being normally held apart from one another to establish a continuous fluid path through said couplings, a pair of enclosing rings each extending inwardly from an inner wall of a respective coupling and defining a first restrictor gap between the enclosing ring and a respective slide valve, said slide valves each being axially movable within a respective enclosing ring and including a guide ring mounted thereon and extending radially outwardly of the body of the slide valve for defining a second restrictor gap between the guide ring and an inner wall of its respective coupling and a valve head, and sealing means surrounding said valve heads and extending outwardly therefrom, said sealing means comprising at least one circumferential element capable of exhibiting substantial resiliency at extremely low temperatures, and being movable into sealing abutment with an inner surface of said fluid passage.

* * * * *